Patented July 4, 1950

UNITED STATES PATENT OFFICE 2,513,572

HALOGENATED (2-THENOYL)-O-BENZOIC ACIDS

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,669

3 Claims. (Cl. 260—329)

This invention relates to the preparation of new halogen-substituted (2-thenoyl)-o-benzoic acids, and more particularly to the preparation of the chloro- and bromo-substituted compounds of the formula:

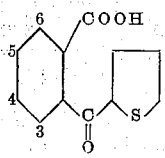

in which the halogen in one or more of the positions 3, 4, 5 and 6 are substituted by chlorine or bromine.

It is an object of this invention to prepare a new intermediate compound suitable for further condensation or reaction, particularly in the preparation of new dyes. A further object of the invention is to provide a commercially feasible process for the preparation of these new halogen-containing compounds.

While in the preparation of the corresponding benzoyl benzoic acids the Friedel-Crafts condensation of halogenated phthalic anhydrides with benzene takes place even more readily than the condensation of the unsubstituted phthalic anhydride with benzene, it was found that the halogen-substituted compounds of the present invention could not be produced satisfactorily by the Friedel-Crafts condensation of the halogenated phthalic anhydrides with thiophene.

The new compounds of the present invention may be prepared in good yields and purity by reacting halogenated phthalic anhydrides with the Grignard reagent prepared from the alpha-halogenated thiophene. Because of the unsymmetrical configuration of thiophene, two isomeric halogenated (2-thenoyl)-o-benzoic acids are frequently obtained, but these may be separated by crystallization, selective acidification of their salt solution, or by taking advantage of the differing solubilities of their salts.

The Grignard reagent employed in the process of this invention may be made from either the alpha-bromo or the alpha-iodo-thiophene. The reaction between the Grignard reagent and the halogenated phthalic anhydride takes place readily at temperatures of below 0° to 70° C.

The following examples are given to illustrate the invention. The parts used are by weight.

Example 1

The preparation of the Grignard reagent, and the subsequent condensation with 3,6-dichlorophthalic anhydride, was carried out in vessels which were constantly swept with dry nitrogen.

Nine (9) parts of magnesium metal turnings and a crystal of iodine were added to 250 parts of anhydrous ether. A solution of 49 parts of alpha-bromothiophene in 50 parts of anhydrous ether was prepared; a small fraction of this solution was added to the magnesium charge and heat was applied to start the reaction. As soon as the reaction set in, the agitation was started and the alpha-bromothiophene solution was added during about one hour at such a rate that vigorous refluxing, indicating a satisfactory rate of reaction, continued. Depending upon the charge size, more or less external cooling was required during that addition. The charge was refluxed for an additional one to two hours (charge temperature from 30° to 36° C.) and then cooled to below 25° C.

Sixty-five (65) parts of 3,6-dichloro phthalic anhydride was dissolved in 1400 parts of dry benzene and the temperature of the solution was raised to 50° C. The unfiltered Grignard reagent, as obtained above, was added to the well-agitated 3,6-dichlorophthalic anhydride solution in about one minute. The temperature of the charge rose from 50° to 58° C., and a milky-white precipitate was formed. The reaction mass was refluxed at a charge temperature of 60° C. for about one hour and then cooled to about 20° C. Five hundred (500) parts of cold water were gradually added at from 20° to 30° C. and the charge was refluxed again for about one hour. Ten (10) parts of magnesium oxide were then added to make certain that all acids were converted to the magnesium salts, and agitation was continued for several hours while the temperature was held at 20° to 25° C.

The benzene-ether layer was separated by gravity from the slightly alkaline aqueous layer. An oily precipitate, which solidified upon standing, was formed when the water layer was made strongly acid with hydrochloric acid.

Sixty-seven (67) parts of crude 3,6-dichloro-(2-thenoyl)-o-benzoic acid were obtained, equal to a yield of 74.4% based on the alpha-bromothiophene. The product was readily crystallized from about 2.5 parts of benzene per part of crude product, and was then obtained as white crystals melting at 145°-146° C. The color of its sulfuric acid solution was yellow.

Acetic acid did not precipitate the 3,6-dichloro-(2-thenoyl)-o-benzoic acid from its magnesium or sodium salt solutions.

Example 2

The Grignard reagent was prepared as in Example 1 from 14 parts of magnesium turnings, 500 parts of anhydrous ether and 84 parts of alpha-bromothiophene.

The Grignard reagent was poured into a suspension of 143 parts of tetrachlorophthalic anhydride in 1400 parts of benzene at a temperature of from 45° to 60° C. The charge was refluxed about two hours, and treated with about 500 parts of water as described in Example 1. The magnesium salt of the 3,4,5,6-tetrachloro-(2-thenoyl)-o-benzoic acid was very insoluble in the water and was isolated by filtration. About 9% of unreacted tetrachlorophthalic acid was isolated from the aqueous filtrate.

The filter cake of the 3,4,5,6-tetrachloro-(2-thenoyl)-o-benzoic acid was slurried in 1000 parts of 90° C. water and hydrochloric acid was added until the charge was strongly acid. The crystalline precipitate changed to an oil and crystallized again as the free acid after a short time. The precipitate was filtered at 25° C., washed mineral acid-free and dried. One hundred and fifty-nine (159) parts of crude 3,4,5,6-tetrachloro-(2-thenoyl)-o-benzoic acid was obtained, melting from 197° to 200° C. This was equal to a yield of 95%, based on the amount of tetrachlorophthalic anhydride consumed.

Upon recrystallization from 3 parts of chlorobenzene per part of crude product, pure 3,4,5,6-tetrachloro-(2-thenoyl)-o-benzoic acid was obtained as white crystals melting at 206° to 207° C. The color of its sulfuric acid solution was yellow. Acetic acid did not precipitate it from its magnesium salt solution.

*Example 3*

The Grignard reagent was prepared as in Example 1 from 5 parts of magnesium turning, 900 parts of ether and 24.5 parts of alpha-bromothiophene. This solution was added to a solution of 27.4 parts of freshly distilled 3-chloro-phthalic anhydride in 800 parts of benzene held at 40° to 45° C. The charge, containing a white precipitate, was refluxed at a temperature of from 50° to 60° C. for about two hours. Five hundred (500) parts of water and one part of magnesium oxide were added and refluxing was continued for several hours. The reaction mass was then filtered at room temperature, and the light-colored, aqueous layer containing the two isomeric chloro-(2-thenoyl)-o-benzoic acids was separated.

The two isomers were separated from each other by acidifying their magnesium salt solutions first with acetic acid, then with hydrochloric acid.

Acetic acid was added to the magnesium salt solution until no further precipitate was formed. Twelve (12) parts of a crude 6-chloro-(2-thenoyl)-o-benzoic acid were formed, melting at 223°–226° C., equal to a yield of 30% of theory. Upon crystallization from 27 parts of chlorobenzene per part of crude product, the pure 6-chloro-(2-thenoyl)-o-benzoic acid melting at 238°–239° C. was obtained.

The acetic acid filtrate from above was acidified with hydrochloric acid until no further precipitate was formed. Fourteen (14) parts of 3-chloro-(2-thenoyl)-o-benzoic acid were obtained, equal to a yield of 35% of theory, melting from 100°–115° C. The 3-chloro isomer was much more soluble in chlorobenzene than the 6-chloro isomer, and was crystallized from that solvent using only three parts of chlorobenzene per part of crude 3-chloro-(2-thenoyl)-o-benzoic acid, resulting in the pure isomer melting at 128°–129° C.

Both of the chloro-(2-thenoyl)-o-benzoic acids thus obtained were white, crystalline products soluble in sulfuric acid with a yellow color.

The constitution of these two chloro-(2-thenoyl)-o-benzoic acids was established by reducing the known 6-nitro-(2-thenoyl)-o-benzoic acid (see Example 2 of co-pending application Serial No. 723,670) to the 6-amino-(2-thenoyl)-o-benzoic acid, diazotizing the latter and converting it to the 6-chloro-(2-thenoyl)-o-benzoic acid by the Sandmeyer reaction. The 6-chloro-(2-thenoyl)-o-benzoic acid thus obtained melted at 238°–239° C. The chloro-(2-thenoyl)-o-benzoic acid melting at 128°–129° C. can therefore only be the 3-chloro-(2-thenoyl)-o-benzoic acid.

*Example 4*

The Grignard reaction was carried out as described in the preceding examples, using 9 parts of magnesium turnings, 250 parts of ether and 63 parts of alpha-iodothiophene. The Grignard solution was poured into a solution of 61 parts of 4-chlorophthalic anhydride in 1100 parts of benzene, at a temperature of 40° to 50° C., and a white precipitate formed at once. The charge was refluxed for several hours, then diluted with 750 parts of water, refluxed again and filtered. The two isomeric chloro-(2-thenoyl)-o-benzoic acids thus obtained were separated from each other by acidifying their magnesium salt solution first with acetic acid, then with hydrochloric acid.

Thus, by adding acetic acid to the aqueous layer of the filtrate a crystalline precipitate was obtained which, after filtering, washing and drying amounted to 42 parts, equal to a yield of 47.3% of theory. It had a melting range of from 176° to 193° C. The product was rather insoluble in chlorobenzene but was readily crystallized from nitrobenzene, using 2.5 parts of solvent per part of crude, giving the pure 5-chloro-(2-thenoyl)-o-benzoic acid in the shape of white crystals melting at 225°–226° C.

The acetic acid filtrate from the above isomer was made strongly acid with hydrochloric acid, and 12 parts of 4-chloro-(2-thenoyl)-o-benzoic acid melting at 144°–146° C. were obtained, equal to a yield of 13.5% of theory. This product was much more soluble in chlorobenzene than the 5-chloro isomer, and was crystallized from 2 parts of solvent per part of product, giving the pure 4-chloro-(2-thenoyl)-o-benzoic acid melting at 154°–155° C. Both isomeric chloro-(2-thenoyl)-o-benzoic acids were soluble in sulfuric acid with yellow color.

The constitution of these two chloro-(2-thenoyl)-o-benzoic acids was established by reducing the known 5-nitro-(2-thenoyl)-o-benzoic acid of co-pending application Serial No. 723,670 to the 5-amino-(2-thenoyl)-o-benzoic acid, diazotizing the latter, and converting it to the 5-chloro-(2-thenoyl)-o-benzoic acid by the Sandmeyer reaction. The 5-chloro-(2-thenoyl)-o-benzoic acid thus obtained melted at 225°–226° C. The chloro-(2-thenoyl)-o-benzoic acid melting at 154°–155° C. can therefore only be the 4-chloro-(2-thenoyl)-o-benzoic acid.

*Example 5*

The Grignard reagent was prepared as described in the preceding examples, using 400 parts of ether, 9 parts of magnesium turnings and 49 parts of alpha-bromothiophene. It was added to a suspension of 65 parts of 3,4-dichlorophthalic anhydride in 1100 parts of benzene at from 45° to 50° C. over a period of 5 minutes. The charge was refluxed for several hours, 1250 parts of water were added, and heating to about 50° C. was continued for several hours longer. The charge was then filtered at about 25° C.

A poorly soluble magnesium salt of the condensation product was retained on the filter funnel, while the aqueous layer of the filtrate contained a soluble magnesium salt.

The insoluble fraction was slurried in 1000 parts of hot water, acidified with hydrochloric acid, and the precipitate thus formed dissolved in about 1000 parts of dilute sodium carbonate. This solution was filtered and acidified with acetic acid. A white, crystalline precipitate was formed amounting to 15 parts, equal to 16.6% of theory as dichloro-(2-thenoyl)-o-benzoic acid, melting from 199°–201° C. About half a part more of the same isomer, melting from 194°–197° C., was obtained by acidifying the acetic acid filtrate with hydrochloric acid, making the total yield of this isomer 17.2% of theory. By crystallizing one part of crude product from 5 parts of chlorobenzene, a pure dichloro-(2-thenoyl)-o-benzoic acid, melting at 202°–203° C., was obtained.

The aqueous solution of the magnesium salt of the original separation of the condensation mass was acidified first with acetic acid, giving 17 parts of dichloro-(2-thenoyl)-o-benzoic acid melting at 152°–153° C.; then the acetic acid filtrate was acidified with hydrochloric acid, giving 20 parts of dichloro-(2-thenoyl)-o-benzoic acid melting from 156° to 159° C. Both fractions proved to be identical. Thus, in this case the separation of the isomers was already accomplished by the solubility of their magnesium salts in water. The total yield of the second isomer, which melted at 166°–167° C. after crystallizing it from 2.5 parts of chlorobenzene per part of crude product, was 40.9% of theory.

*Example 6*

The Grignard reagent was prepared as in Example 1 from 27 parts of alpha-bromothiophene, 6 parts of magnesium and 600 parts of ether. This solution was poured into a solution of 44.5 parts of 4-bromophthalic anhydride in 800 parts of benzene over a period of 5 minutes at a temperature of from 30° to 37° C. A creamy white precipitate was formed and the reaction mass was heated to reflux for one hour. Five hundred (500) parts of water and about one part of magnesium oxide were added, and refluxing was continued for about one hour.

The solvent layer was then separated from the water solution of the magnesium salt of the bromo-(2-thenoyl)-o-benzoic acids. The water layer was acidified with acetic acid until no further precipitate was formed. 21.2 parts of a crude bromo-(2-thenoyl)-o-benzoic acid melting from 198°–212° C. were obtained, equal to a yield of 42.5% of theory. After crystallizations from 10 parts of chlorobenzene per part of crude keto acid, a pure bromo-(2-thenoyl)-o-benzoic acid, melting at from 224°–226° C., was obtained.

The acetic acid filtrate was acidified with hydrochloric acid. A pale yellow oil was precipitated, which solidified to a crystalline product after several hours. 3.8 parts of a crude bromo-(2-thenoyl)-o-benzoic acid, melting from 133° to 143° C., was obtained, equal to a yield of 7.5% of theory. After crystallization from 50 parts of high boiling gasoline and 5 parts of toluene, a pure bromo-(2-thenoyl)-o-benzoic acid, melting at 145.5°–146° C., was obtained.

In the above examples, the halogenated phthalic anhydrides may be dissolved or suspended in other solvents than benzene. The solvent, however, should be one which does not react upon the Grignard reagent. Ethers other than the diethyl ether may also be used, and the amount of ether employed may be varied within wide limits.

To obtain maximum yields, it has been found that the Grignard reagent should be added to the solution of suspensions of the halogenated phthalic anhydrides. The time of addition may be varied widely, and is mainly determined by the cooling capacity which is required to maintain the reaction at any desired temperature. The method for isolating the final halogenated (2-thenoyl)-o-benzoic acids will be dictated by such considerations as whether or not isomers are to be expected, and if so, will have to be separated. In case a separation of isomers is required, it has been found most convenient to accomplish it by acidifying their salt solutions first with weak acids, such as acetic acid, then with strong mineral acids like sulfuric acid.

In the case of the 3,6-dichlorophthalic anhydride or the 3,4,5,6-tetrachlorophthalic anhydride, the corresponding halogen (2-thenoyl)-o-benzoic acids are obtained free from isomers. In other cases where unsymmetrical halogenated phthalic anhydrides are used, two isomers are usually formed because both —CO groups of the phthalic anhydride appear to be reactive, regardless of the position of the substituent halogen.

We claim:

1. The halogen-substituted (2-thenoyl)-o-benzoic acids of the formula:

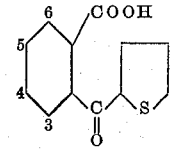

which carry in at least one of the positions 3, 4, 5 and 6 a halogen of the group consisting of chlorine and bromine and which carry the same halogen in these positions when more than one position is halogen-substituted.

2. A mono-chloro-(2-thenoyl)-o-benzoic acid of the formula:

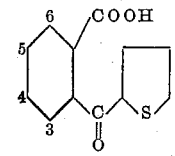

in which the chlorine substituent is in one of the positions 3, 4, 5, and 6 while the remaining positions are substituted with hydrogen.

3. A mono-bromo-(2-thenoyl)-o-benzoic acid of the formula:

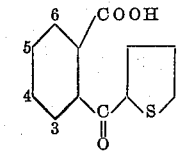

in which the bromine substituent is in one of the positions 3, 4, 5, and 6 while the remaining positions are substituted with hydrogen.

HENRY R. LEE.
VIKTOR WEINMAYR.

REFERENCES CITED

The following references are of record in the file of this patent:

Thomas "Anhydrous Aluminum Chloride," pages 540, 543, 544 and 547. Reinhold Pub. Co., 1941.